United States Patent

[11] 3,593,075

[72] Inventors Thomas Pantelakis
Margate;
Dudley D. Nye, Jr., Fort Lauderdale, both of, Fla.
[21] Appl. No. 837,456
[22] Filed June 30, 1969
[45] Patented July 13, 1971
[73] Assignee Borg-Warner Corporation
Chicago, Ill.

[54] MOTOR CONTROL SYSTEM WITH LINEAR ACCELERATION CIRCUIT
8 Claims, 1 Drawing Fig.
[52] U.S. Cl. .................................................. 318/391,
318/332, 318/403
[51] Int. Cl. ................................................... H02p 1/04
[50] Field of Search .......................................... 318/400,
391, 331, 345

[56] References Cited
UNITED STATES PATENTS
3,366,861 1/1968 Dudler .......................... 318/345
2,929,980 3/1960 Anger ........................... 318/400
3,037,157 5/1962 Young .......................... 318/400
3,163,812 12/1964 Greening ...................... 318/400

Primary Examiner—Oris L. Rader
Assistant Examiner—Thomas Langer
Attorneys—Donald W. Banner, William S. McCurry and John W. Butcher ABSTRACT: A DC motor control system is energized over power semiconductor switches controlled by firing circuits. A control amplifier is connected to regulate the firing circuits and thus regulate motor energization. An adjustable potentiometer provides a speed reference signal. A linear acceleration stage, coupled between the adjustable potentiometer and the control amplifier, translates step function increases of the potentiometer setting into a smooth speed increase signal. The linear acceleration stage includes a capacitor connected in a charging circuit to provide this smooth speed increase signal in response to turnoff of a transistor which, when conducting, disables the charging circuit. An operational amplifier is connected to turn off the transistor and allow the capacitor to charge when the speed control potentiometer is adjusted to signal a speed increase. Responsive to a speed decrease, the transistor is immediately gated on to discharge the capacitor and subsequently assist the system in preventing motor coastdown below the new speed setting.

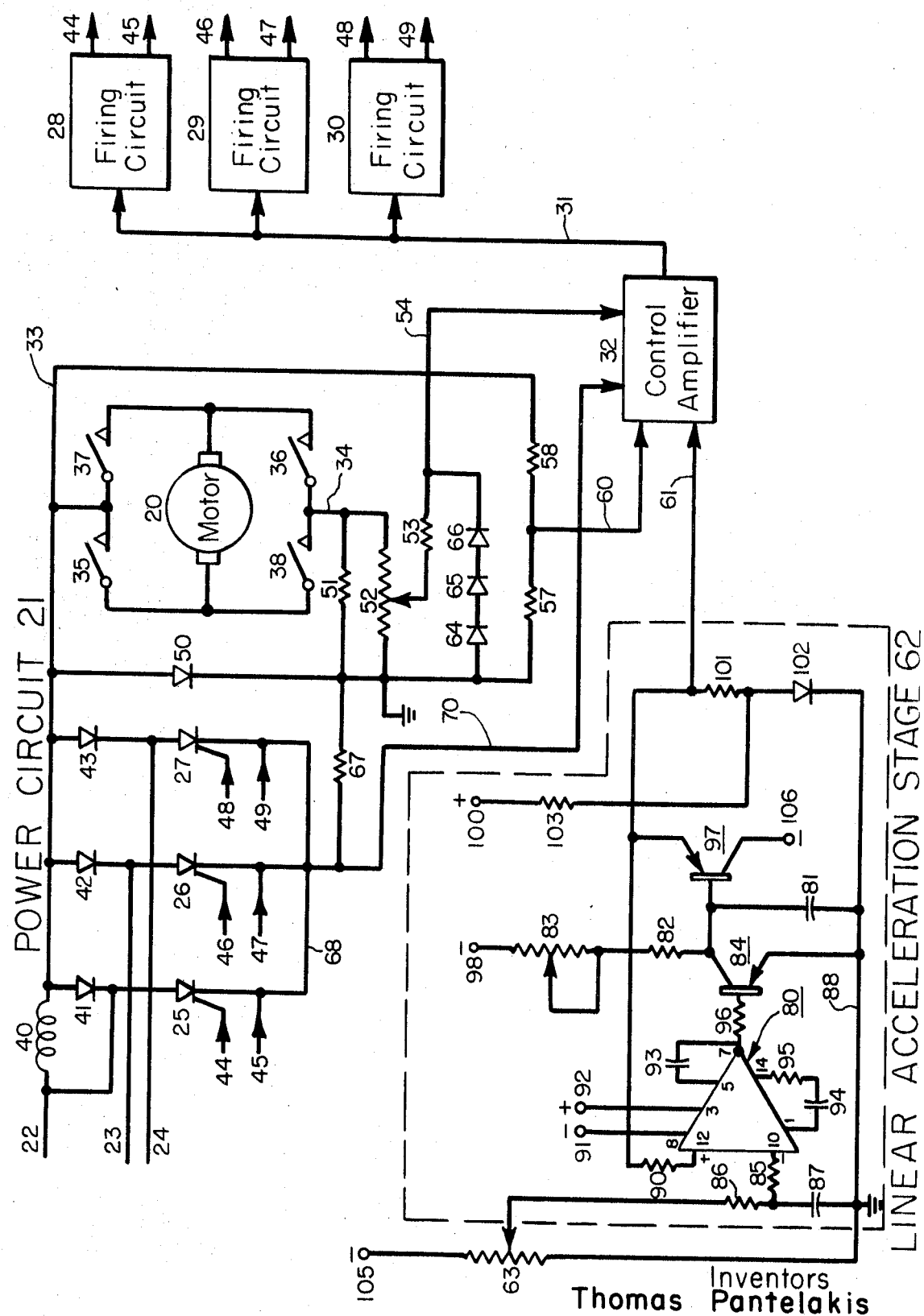

MOTOR CONTROL SYSTEM WITH LINEAR ACCELERATION CIRCUIT

BACKGROUND OF THE INVENTION

Various types of speed control arrangements have been employed in the regulation of DC motors. Frequently a potentiometer or other adjustable arrangement is utilized to provide a reference signal which ultimately determines the motor speed. However, when the potentiometer is suddenly adjusted in a direction to increase the motor speed, if this sudden adjustment is translated as a step function signal to the circuit which regulates the motor speed, this may cause damaging surge current in the motor armature in a manner known to those familiar with control systems. In an effort to obviate such undesired system response various circuits have been developed and interposed between the speed reference potentiometer and the circuit (such as a control amplifier) which regulates the motor energization and thus determines its speed. In general these circuits attempt to provide a gradual, approximately linear change in the output control signal in response to receipt of a step function signal from the speed regulating potentiometer. In many instances such circuits have proved unsatisfactory, both because of failure to achieve sufficient linearity in the output signal, and because they cannot rapidly follow speed set-down signals, tending to prevent the motor from slowing down at the maximum rate to the new speed setting.

It is therefore a primary consideration of this invention to provide a linear acceleration stage for a motor control system in which the output signal is virtually linear in response to an input increase-speed signal of the step function type.

Another salient consideration of this invention is to provide such a linear acceleration circuit which immediately follows reduced-speed signals, and does not produce a ramp or gradually varying signal when the motor speed is reduced.

It is another important consideration to provide a system which utilizes a feedback amplifier to insure that the output of the linear acceleration stage is accurately regulated in the steady state to match the setting of the reference or "speed" potentiometer.

SUMMARY OF THE INVENTION

This invention is useful in various control arrangements and finds particular utility in an energizing system for an electrical motor in which electrical energy is passed to the motor through a power circuit including at least one semiconductor power switch. The system includes a control amplifier having an input circuit, and having an output circuit connected to regulate operation of the semiconductor power switch and thus regulate energization of said motor. An adjustable reference means, such as a potentiometer, is connected to provide a speed reference signal which varies as the reference means is adjusted.

Particularly in accordance with the present invention, a linear acceleration stage is coupled between the adjustable reference means and the control amplifier input circuit. The linear acceleration stage includes an operational amplifier connected to provide a switching signal as the adjustable reference means is varied to signal a speed increase. A capacitor is connected in a charging circuit to charge and thus provide a smooth speed change signal for application to the control amplifier input circuit. A semiconductor switch is connected to disable the charging circuit until the switching signal is provided by the operational amplifier, and also to rapidly discharge the capacitor when the adjustable reference means is varied to signal a speed decrease.

THE DRAWING

The single FIGURE of the drawing, partly schematic and partly in block form, shows the present invention incorporated in a DC motor energizing system.

DETAILED DESCRIPTION OF THE INVENTION

The drawing depicts a motor energizing system in which the armature circuit of a motor 20 receives energy from a power circuit 21 which, in turn, is supplied with AC energy over three input conductors 22, 23 and 24. The level of energy passed to the motor is determined by the conduction times of semiconductor power switches or silicon controlled rectifiers (SCR's) 25, 26 and 27 which, in turn, are regulated by gating signals provided by firing circuits 28, 29 and 30. The firing circuits are regulated by an output signal received over circuit 31 from a control amplifier 32, which operates in response to different input signals.

Motor 20 is energized as DC energy is passed through power circuit 21 and applied between conductors 33 and 34. When switches 35 and 36 are closed, current flows through motor 20 in a first direction and effects motor rotation in a given angular direction. When switches 35, 36 are opened and switches 37, 38 are closed (by control components which are not illustrated because they are well known), current flows through motor 20 in the opposite direction and effects motor rotation in the opposite angular direction.

Motor field winding 40 is coupled between conductors 22 and 33. Three diodes 41, 42 and 43 are respectively coupled in series with the semiconductor switches 25, 26 and 27. The input conductors 22—24 are respectively connected to the common connections between each diode-SCR pair. Although the semiconductor switches 25—27 are illustrated as silicon controlled rectifiers, other components such as thyratrons, ignitrons, power transistors, transistors, electron-discharge devices and similar switching units can be used in their place. Only one semiconductor power switch is required to regulate the level of motor energization. Such switch can be coupled in a series circuit connection, in a "chopper" or DC-to-DC converter arrangement, in lieu of the illustrated three-phase rectifier arrangement. Silicon controlled rectifier 25 receives gating signals over conductors 44, 45 from firing circuit 28; SCR 26 receives gating signals over conductors 46 and 47 from firing circuit 29; and semiconductor switch 27 receives firing signals over conductors 48, 49 from firing circuit 30.

A "freewheeling" diode 50 is coupled between conductor 33 and ground. Because of the inductive reactance of the motor, the turnoff of a given silicon controlled rectifier may terminate current supply while the motor tends to keep current flowing; the freewheeling diode 50 maintains a path for the continuing current flow. A resistor 51 is coupled between conductor 34 and ground. A potentiometer 52 is coupled between conductor 34 and ground, and the movable arm is coupled over a resistor 53 and a conductor 54 to a control amplifier 32. A pair of resistors 57, 58 are coupled in series between conductor 33 and ground, and conductor 60 is coupled between the midpoint of these two resistors and a first input connection of control amplifier 32.

In accordance with this invention, control amplifier 32 also receives a speed reference signal over line 61 from a linear acceleration stage 62 which in turn receives an input signal from the movable arm of an adjustable reference means, shown as a potentiometer 63. Linear acceleration stage 62 is utilized to translate a step function change of the setting of potentiometer 63 into a gradual, smooth transition of a speed control signal applied over line 61 to the control amplifier stage 32, and to preclude overshoot when the speed is set down.

Three diodes 64, 65 and 66 are coupled in series between conductor 54 and ground to protect against an unduly large signal being passed over conductor 54 to the control amplifier stage if resistor 51 were open, or if for some other reason an excess of current were to be suddenly supplied over resistor 53. A resistor 67 is coupled between ground and a common conductor 68 coupled to the cathodes of all the semiconductor switches 25, 26 and 27. Conductor 70 is coupled to the common connection of resistor 67 and common conductor 68, and is also coupled to control stage 32.

In the circuit of linear acceleration stage 62 an operational amplifier (op amp) 80 is provided to produce a switching signal as the adjustable reference means or potentiometer 63 is varied to signal a speed increase. A capacitor 81 is connected in a charging circuit which also comprises a resistor 82 and a linear accelerator timing control potentiometer 83. Charging of capacitor 81 provides the requisite linear speed change signal for application over conductor 61 to the control amplifier stage, when a step change signal is created by displacing the movable arm of potentiometer 63. A first semiconductor switch, shown as a PNP-ytpe transistor 84, is connected to disable the charging circuit until the switching signal is provided by op amp 80. In addition, as transistor 84 is gated on responsive to an indication either that the new (higher) speed has been reached, or that a speed reduction signal is provided by set-down of potentiometer 63, transistor 84 conducts to effect substantially instantaneous discharge of capacitor 81 and prevent speed overshoot or undershoot in the system.

In more detail, the terminals of op amp 80 are referenced internally except for output terminal 7, to assist those skilled in the art to practice the invention with a minimum of experimentation. Input terminal 10 is coupled through a series circuit comprising series-coupled resistors 85 and 86 to the movable arm of potentiometer 63. A capacitor 87 is coupled between reference or ground conductor 88 and the common connection between resistors 85 and 86. The other input connection 12 is coupled over a resistor 90 to conductor 61. Terminal 8 is connected to a terminal 91, for receiving a negative energizing potential, and terminal 92 is connected to op amp terminal 3 for providing a positive voltage when the system is energized. Frequency compensation components include capacitor 93 coupled between terminals 5 and 7, and a series circuit including capacitor 94 and resistor 95, coupled between terminals 1 and 14.

A resistor 96 is coupled in series between output terminal 7 of the op amp and the base of first semiconductor switch 84. This switch, shown as a PNP-type transistor, has its emitter coupled to ground and its collector coupled to the common connection between capacitor 81, resistor 82, and the base of a second semiconductor switch shown as another PNP-type transistor 97. Terminal 98 provides an input connection for receiving a negative energizing voltage and terminal 100 is a similar connection for receiving a positive voltage, when the system is energized. A series of circuit including a resistor 101 and a diode 102 is coupled between output conductor 61 and reference conductor 88. Another resistor 103 is coupled between terminal 100 and the common connection between resistor 101 and diode 102.

Initially with no variation in the reference signal provided by potentiometer 63, there is a negative-polarity signal at output terminal 7 of op amp 80, and this signal is applied over resistor 96 to the base of first transistor 84, maintaining this PNP-type transistor conducting. In effect the first semiconductor switch 84 disables the charging circuit 81—83 until a step-up signal is provided from potentiometer 63.

Assuming now that the movable arm of potentiometer 63 is displaced upwardly, toward the terminal 105, this action provides a step function signal which is applied over resistors 86 and 85 to input connection 10 of the op amp. This input signal produces a change in the polarity of the output signal at terminal 7, which is effective to turn off transistor 84. Accordingly capacitor 81 begins to charge as current flows from conductor 88, through capacitor 81, resistor 82, and potentiometer 83 to terminal 98. This charging action produces a ramp waveform signal which is passed through second transistor 97 and over output conductor 61 to the control amplifier stage.

Transistor 97 is connected in an emitter-follower configuration including emitter resistor 101. Diode 102, energized via resistor 103 from a positive power supply source represented by terminal 100, provides approximately 0.7 volt bias to bring transistor 97 just to the conductive state when the reference voltage from potentiometer 63 and the voltage across capacitor 81 is at substantially zero. This prevents any noticeable dead time in the ramp function output when setting the speed up from zero.

As noted previously it is important to provide a substantially linear ramp, or slope, of the signal passed over conductor 61. The ramp waveform of voltage rise on conductor 61 will build up until it matches the reference voltage set on input terminal 10 of op amp 80. This occurs as a result of negative feedback through resistor 90 to plus terminal 12 of the op amp. To assist in achieving this linearity, the level of supply voltage applied to terminal 98 of the charging circuit is selected such that the entire amplitude of variation of the speed change signal developed across capacitor 81 is much smaller, by at least an order of magnitude, than the level of the voltage applied to terminal 98 and toward which capacitor 81 is charged. "Order of magnitude," as used herein and in the appended claims, refers to variations by powers of 10 (except for the same order of magnitude) with respect to a reference value. By way of example, taking 5 as a reference value, other values from one-fifth to 5 times the reference value (from 1 to 25) are considered to be within the same order of magnitude as the reference value 5. Values from 0.1 to 1.0 are considered to be an order of magnitude less, referred to the value 5; 0.01 to 0.1 is considered in the second order of magnitude less; and so forth. This circuit arrangement insures that the entire ramp waveform is generated during the initial charge of capacitor 81, a period much less than one time constant, which those skilled in the art appreciate is substantially a linear change in the signal passed over output conductor 61 when a step function speed increase signal is received at input terminal 10 of the op amp.

Solely to assist those skilled in the art to practice the invention with a minimum of experimentation, and in no sense by way of limitation, a table of circuit component identifications and values for the linear acceleration stage 62 is set out below. In the stage op amp 80 was a G.E. integrated circuit, type PA-238. A negative 16 volt potential relative to ground conductor 88 was applied to terminal 98, and capacitor 81 was charged only in the range of 0 to 1.0 volt to effect the requisite speed change signal output and balance the circuit. Thus it is apparent that the voltage applied to terminal 98 is larger, by at least an order of magnitude, than the voltage developed across capacitor 81 to represent the smooth speed change signal. A −6 volt potential was applied to terminal 91, and a +6 volt potential was applied to terminals 92 and 100. The identifications and values of the other components were:

| | |
|---|---|
| 84 | 2N3638 |
| 97 | 2N3638A |
| 102 | 1N5059 |
| 81 | 1,000 mfd., ±20%, 3 vDC |
| 87 | 25 mfd., −10 to +50%, 3 vDC |
| 93 | 47 pfd., ±10%, 500 vDC |
| 94 | 0.033 mdf., ±10%, 250 vDC |
| 82 | 5.1 K ohms, ±5% |
| 83 | 1.0 M ohms, ±30% |
| 85, 90 | 15 K ohms, ±5% |
| 86 | 100 ohms, ±10% |
| 95 | 390 ohms, ±10% |
| 96 | 4.7 K ohms, ±10% |
| 101, 103 | 10 K ohms, ±10% |

While only a preferred embodiment of the invention has been described and illustrated, it is apparent that various modifications and alterations may be made therein. It is therefore the intention in the appended claims to cover all such modifications and alterations as may fall within the true spirit and scope of the invention.

What we claim is:

1. An energizing system for an electrical motor in which electrical energy is passed to the motor through a power circuit including at least one semiconductor power switch, comprising:
   a control amplifier having an input connection, and having an output connection connected to regulate operation of the semiconductor power switch and thus regulate energization of said motor,
   adjustable reference means, connected to provide a speed reference signal which varies as said reference means is adjusted, and
   a linear acceleration stage, coupled between said adjustable reference means and the control amplifier input connection, including an operational amplifier connected to provide a switching signal as the adjustable reference means is varied to signal a speed increase, a charging circuit including a capacitor coupled to the operational amplifier to charge and provide a smooth speed change signal for application to the control amplifier input connection, and a first semiconductor switch, connected to disable the charging circuit until the switching signal is provided by the operational amplifier, and to rapidly discharge the capacitor as the adjustable reference means is varied to signal a speed decrease.

2. A motor energizing system as claimed in claim 1 in which a supply voltage is applied to said charging circuit, which supply voltage is larger by at least an order of magnitude than the voltage developed across said capacitor to represent the smooth speed change signal, to insure that only the initial portion of the capacitor-charging waveform is applied to the control amplifier and provide a linear ramp output signal in response to a step function input signal received by the linear acceleration stage.

3. A motor energizing system as claimed in claim 1 in which said operational amplifier includes a pair of input terminals and an output terminal, circuit means completing a negative feedback between the output terminal and one of the input terminals, and means for applying the speed reference signal to the other input terminal, such that the ramp increase in the smooth speed change signal is terminated by comparing the smooth speed change signal with the speed reference signal over the negative feedback path.

4. A motor energizing system as claimed in claim 1 in which said linear acceleration stage includes a second semiconductor switch, coupled between said capacitor and the output conductor for applying the output signal from the linear acceleration stage to the control amplifier.

5. A motor energizing system as claimed in claim 4, in which both said first and second transistors have base, emitter and collector elements, the base of the first transistor being coupled to the output side of the operational amplifier, the emitter of the first transistor being coupled to a reference conductor, the collector of said first transistor being coupled to the common connection between said capacitor and at least one resistance component in the charging circuit, such that the emitter-collector path of the first transistor is coupled directly in parallel with said capacitor, the base of said second transistor being coupled to the collector of said first transistor and to one plate of said capacitor, the collector of said second transistor being connected to receive an energizing potential, and the emitter of the second transistor being coupled over the output conductor to the control amplifier.

6. A motor energizing system as claimed in claim 5 and further comprising a series circuit, including a first resistor and a diode, coupled between said output conductor and said reference conductor, means including a second resistor coupled to the common connection between said first resistor and diode in the series circuit, for applying a potential to said series circuit to complete the energizing path for said second transistor.

7. An energizing system for a DC electrical motor in which electrical energy is passed to the motor through a power circuit including a plurality of SCR's regulated by a corresponding plurality of firing circuits, comprising:
   a control amplifier stage having an input circuit, and having an output circuit connected to regulate operation of the firing circuits and thus regulate energization of the motor,
   a potentiometer, connected to provide a speed reference signal which varies as the setting of said potentiometer is adjusted, and
   a linear acceleration stage, including an operational amplifier having a first input terminal, a second input terminal coupled to said potentiometer, and an output terminal for providing a switching signal as the potentiometer is adjusted to signal a speed increase, a charging circuit including a resistor and a capacitor coupled in series between an energizing connection and a reference conductor such that charging of the capacitor provides a smooth speed change signal for application over an output conductor to the control amplifier stage, and a transistor, having a base coupled to the control amplifier output terminal, and having its collector and emitter coupled to opposite plates of said capacitor, said transistor being normally biased for conduction to disable the charging circuit until the switching signal is provided by the operational amplifier to turn off the transistor and allow the capacitor to charge, and which transistor is rapidly gated on when the motor speed reaches the desired speed, to rapidly discharge the capacitor.

8. A motor energizing system as claimed in claim 7 in which a resistor is coupled between the first input terminal of the operational amplifier and the capacitor to complete a negative feedback path, such that the ramp increase in the smooth speed change signal developed by charging of the capacitor is terminated by comparing the smooth speed change signal with the speed reference signal over the negative feedback path.